United States Patent
Patterson

(10) Patent No.: US 10,733,604 B2
(45) Date of Patent: *Aug. 4, 2020

(54) ACCOUNT PERMANENCE

(71) Applicant: Visa U.S.A. Inc., San Francisco, CA (US)

(72) Inventor: Barbara Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/053,699

(22) Filed: Aug. 2, 2018

(65) Prior Publication Data

US 2019/0073667 A1 Mar. 7, 2019

Related U.S. Application Data

(63) Continuation of application No. 14/306,017, filed on Jun. 16, 2014, now abandoned, which is a continuation of application No. 13/460,293, filed on Apr. 30, 2012, now Pat. No. 8,793,186, which is a continuation of application No. 13/072,436, filed on
(Continued)

(51) Int. Cl.
| | | |
|---|---|---|
| *G06Q 10/00* | (2012.01) |
| *G06Q 20/38* | (2012.01) |
| *G06Q 20/10* | (2012.01) |
| *G06Q 20/40* | (2012.01) |
| *G06Q 30/04* | (2012.01) |
| *G06Q 40/00* | (2012.01) |
| *G06Q 40/02* | (2012.01) |

(52) U.S. Cl.
CPC .......... *G06Q 20/385* (2013.01); *G06Q 20/10* (2013.01); *G06Q 20/102* (2013.01); *G06Q 20/40* (2013.01); *G06Q 30/04* (2013.01); *G06Q 40/00* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 5,365,046 | A | 11/1994 | Haymann |
| 5,613,012 | A | 3/1997 | Hoffman |

(Continued)

FOREIGN PATENT DOCUMENTS

| | | |
|---|---|---|
| AU | 2008298750 | 4/2014 |
| EP | 2156397 A1 | 2/2010 |

(Continued)

OTHER PUBLICATIONS

Examination Report dated Jun. 21, 2012 in Australian Patent Application No. 2008298750, 4 pages.

(Continued)

*Primary Examiner* — Jonathan G Sterrett
(74) *Attorney, Agent, or Firm* — Kilpatrick Townsend & Stockton LLP

(57) ABSTRACT

A system and method for using derived account identifiers. The derived account identifiers are associated with a single permanent account identifier. Each derived account identifier is associated with a communication channel or portable consumer device.

20 Claims, 6 Drawing Sheets

Related U.S. Application Data

Mar. 25, 2011, now Pat. No. 8,190,523, which is a continuation of application No. 12/205,069, filed on Sep. 5, 2008, now Pat. No. 7,937,324.

(60) Provisional application No. 60/972,088, filed on Sep. 13, 2007.

(56) References Cited

U.S. PATENT DOCUMENTS

| | | |
|---|---|---|
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A * | 12/2000 | Walker .................. G06Q 20/04 705/18 |
| 6,227,447 B1 | 5/2001 | Campisano |
| 6,236,981 B1 | 5/2001 | Hill |
| 6,267,292 B1 | 7/2001 | Walker |
| 6,327,578 B1 * | 12/2001 | Linehan ................. G06Q 20/02 705/65 |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | Demello et al. |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| 7,380,710 B2 | 6/2008 | Brown |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,433,116 B2 | 4/2013 | Davis et al. |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |

(56) References Cited

U.S. PATENT DOCUMENTS

| | | |
|---|---|---|
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 * | 7/2014 | Patterson .............. G06Q 20/10 705/40 |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,219,708 B2 * | 12/2015 | Anati ................... G06F 21/445 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 * | 10/2001 | Brody ................... G06Q 20/00 705/39 |
| 2001/0034702 A1 | 10/2001 | Mockett et al. |
| 2001/0034717 A1 * | 10/2001 | Whitworth .......... G06Q 20/341 705/64 |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0046092 A1 * | 4/2002 | Ostroff .................. G06Q 20/06 705/14.26 |
| 2002/0073045 A1 * | 6/2002 | Rubin ................... G06Q 20/04 705/65 |
| 2002/0116341 A1 | 8/2002 | Hogan |
| 2002/0133467 A1 | 9/2002 | Hobson |
| 2002/0147913 A1 | 10/2002 | Lun Yip |
| 2002/0169719 A1 * | 11/2002 | Dively ................... G06Q 20/02 705/40 |
| 2003/0023552 A1 | 1/2003 | Kight et al. |
| 2003/0028481 A1 | 2/2003 | Flitcroft |
| 2003/0080183 A1 | 5/2003 | Rajasekaran et al. |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0035192 A1 * | 2/2005 | Bonalle ................. G06Q 20/00 235/379 |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0122931 A1 * | 6/2006 | Walker ................... G06Q 20/04 705/39 |
| 2006/0124756 A1 | 6/2006 | Brown |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2007/0299742 A1 * | 12/2007 | Williams ................ G06Q 20/02 705/39 |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0059605 A1 * | 3/2008 | Shalev ................ H04L 12/2814 709/217 |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0263645 A1 * | 10/2008 | Renter ................ G06F 21/6245 726/6 |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0030845 A1 * | 1/2009 | Hurry ................ G06Q 20/3829 705/71 |
| 2009/0037333 A1 | 2/2009 | Flitcroft |
| 2009/0037388 A1 | 2/2009 | Cooper et al. |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |

(56) References Cited

U.S. PATENT DOCUMENTS

| | | |
|---|---|---|
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0238576 A1 | 9/2011 | Patterson |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0278238 A1 | 11/2012 | Patterson |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | McCullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |

(56) References Cited

U.S. PATENT DOCUMENTS

| | | |
|---|---|---|
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

FOREIGN PATENT DOCUMENTS

| | | |
|---|---|---|
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"Petition for Inter Partes Review of U.S. Pat. No. 8,533,860 Challenging Claims 1-30 Under 35 U.S.C. § 312 and 37 C.F.R. § 42.104", Before the USPTO Patent Trial and Appeal Board, IPR 2016-00600, Feb. 17, 2016, 65 pages.

U.S. Appl. No. 13/072,436 , "Notice of Allowance", dated Jan. 31, 2012, 16 pages.

U.S. Appl. No. 13/460,293 , "Non Final Office Action", dated Dec. 11, 2013, 9 pages.

U.S. Appl. No. 13/460,293 , "Notice of Allowance", dated Mar. 26, 2014, 5 pages.

U.S. Appl. No. 14/600,523 , "U.S. Patent Application No.", Secure Payment Processing using Authorization Request, filed Jan. 20, 2015, 42 pages.

U.S. Appl. No. 14/952,444 , "U.S. Patent Application No.", Tokenization Request Via Access Device, filed Nov. 25, 2015, 78 pages.

U.S. Appl. No. 14/952,514 , "U.S. Patent Application No.", Systems Communications with Non-sensitive Identifiers, filed Nov. 25, 2015, 72 pages.

U.S. Appl. No. 14/955,716 , "U.S. Patent Application No.", Provisioning Platform for Machine-to-Machine Devices, filed Dec. 1, 2015, 61 pages.

U.S. Appl. No. 14/966,948 , "U.S. Patent Application No.", Automated Access Data Provisioning, filed Dec. 11, 2015, 52 pages.

U.S. Appl. No. 15/004,705 , "U.S. Patent Application No.", Cloud-based Transactions with Magnetic Secure Transmission, filed Jan. 22, 2016, 161 pages.

(56) References Cited

OTHER PUBLICATIONS

U.S. Appl. No. 15/008,388 , "U.S. Patent Application No.", Methods for Secure Credential Provisioning, filed Jan. 27, 2016, 89 pages.
U.S. Appl. No. 15/011,366 , "U.S. Patent Application No.", Token Check Offline, filed Jan. 29, 2016, 60 pages.
U.S. Appl. No. 15/019,157 , "U.S. Patent Application No.", Token Processing Utilizing Multiple Authorizations, filed Feb. 9, 2016, 63 pages.
U.S. Appl. No. 15/041,495 , "U.S. Patent Application No.", Peer Forward Authorization of Digital Requests, filed Feb. 11, 2016, 63 pages.
U.S. Appl. No. 15/265,282 , "U.S. Patent Application", Self-Cleaning Token Vault, filed Sep. 14, 2016.
U.S. Appl. No. 15/462,658 , "U.S. Patent Application", Replacing Token on a Multi-Token User Device, filed Mar. 17, 2017, 58 pages.
U.S. Appl. No. 61/738,832 , "U.S. Provisional Application No", Management of Sensitive Data, filed Dec. 18, 2012.
U.S. Appl. No. 61/751,763 , "U.S. Provisional Application No", Payments Bridge, filed Jan. 11, 2013.
U.S. Appl. No. 61/879,362 , "U.S. Provisional Application No.", Systems and Methods for Managing Mobile Cardholder Verification Methods, filed Sep. 18, 2013.
U.S. Appl. No. 61/892,407 , "U.S. Provisional Application No", Issuer Over-The-Air Update Method and System, filed Oct. 17, 2013.
U.S. Appl. No. 61/894,749 , "U.S. Provisional Application No", Methods and Systems for Authentication and Issuance of Tokens in a Secure Environment, filed Oct. 23, 2013.
U.S. Appl. No. 61/926,236 , "U.S. Provisional Application No", Methods and Systems for Provisioning Mobile Devices With Payment Credentials and Payment Token Identifiers, filed Jan. 10, 2014.
U.S. Appl. No. 62/000,288 , "U.S. Provisional Application No", Payment System Canonical Address Format, filed May 19, 2014.
U.S. Appl. No. 62/003,717 , "U.S. Provisional Application No", Mobile Merchant Application, filed May 28, 2014.
U.S. Appl. No. 62/024,426 , "U.S. Provisional Application No", Secure Transactions Using Mobile Devices, filed Jul. 14,2014.
U.S. Appl. No. 62/037,033 , "U.S. Provisional Application No", Sharing Payment Token, filed Aug. 13, 2014.
U.S. Appl. No. 62/038,174 , "U.S. Provisional Application No", Customized Payment Gateway, filed Aug. 15, 2014.
U.S. Appl. No. 62/042,050 , "U.S. Provisional Application No", Payment Device Authentication and Authorization System, filed Aug. 26, 2014.
U.S. Appl. No. 62/053,736 , "U.S. Provisional Application No", Completing Transactions Without a User Payment Device, filed Sep. 22, 2014.
U.S. Appl. No. 62/054,346 , "U.S. Provisional Application No", Mirrored Token Vault, filed Sep. 23, 2014.
U.S. Appl. No. 62/103,522 , "U.S. Provisional Application No", Methods and Systems for Wallet Provider Provisioning, filed Jan. 14, 2015.
U.S. Appl. No. 62/108,403 , "U.S. Provisional Application No", Wearables With NFC HCE, filed Jan. 27, 2015.
U.S. Appl. No. 62/117,291 , "U.S. Provisional Application No", Token and Cryptogram Using Transaction Specific Information, filed Feb. 17, 2015.
U.S. Appl. No. 62/128,709 , "U.S. Provisional Application No.", Tokenizing Transaction Amounts, filed Mar. 5, 2015, 30 pages.
AU2008298750 , "Office Action Response", filed Jan. 29, 2013, 20 pages.
Levi et al., "The prevention of cheque and credit card fraud—CiteSeerX", Crime Prevention Unit Paper No. 26, 1991, pp. 1-57.

\* cited by examiner

ACCOUNT PERMANENCE

CROSS-REFERENCES TO RELATED APPLICATIONS

This patent application is a continuation application of U.S. patent application Ser. No. 14/306,017, filed on Jun. 16, 2014, which is a continuation application of U.S. patent application Ser. No. 13/460,293, filed on Apr. 30, 2012, now U.S. Pat. No. 8,793,186, which is a continuation of and claims priority to U.S. patent application Ser. No. 13/072,436, filed on Mar. 25, 2011, now U.S. Pat. No. 8,190,523, issued on May 29, 2012, which is a continuation of and claims priority to U.S. patent application Ser. No. 12/205,069, filed on Sep. 5, 2008, now U.S. Pat. No. 7,937,324, issued May 3, 2011, which claims priority to U.S. Provisional Patent Application No. 60/972,088, filed on Sep. 13, 2007, each of which are herein incorporated by reference in their entirety for all purposes.

BACKGROUND

Transaction cards, such as credit cards, are used to conduct transactions such as payment transactions. A card can be presented in person in order to conduct a transaction (a "card present" transaction). The card can contain an account number. The account number could also be recited over the phone for mail order purchases (a "card not present" transaction). Now, with the rise of cellular telephones, the Internet, and various other communication channels and technologies, account numbers can be used in a number of different ways.

The ubiquity of card transactions and the ease with which they can be made using technology (including in card not present transactions) has led to increased opportunities for fraud. Once fraud has been discovered, the account in question may be suspended and the consumer is issued a new account. The technology does not exist, however, for issuing a replacement account and the means enabling the user to use the replacement account immediately. Instead, the issuance process may take some time, and during this period the consumer cannot use the account over any channel. For example, if a consumer's credit card number is stolen during a card not present transaction, for instance through the use of keylogging software illegally installed on the consumer's computer terminal, the consumer can use the credit card number neither in future card present nor card not present transactions.

Some cards have further identifying features, such as "verification values" or "card security codes," Verification values are 3- or 4-digit numbers that are printed on the face of a credit card. A verification value is often used in "card not present" transactions. If the verification value and the consumer's account number is stolen, then a thief may use this information to conduct purchases in card not present transactions, for instance transactions made through the Internet or by telephone.

Better methods to secure against fraud are desirable. Embodiments of the invention address these and other problems, individually and collectively.

BRIEF SUMMARY

Embodiments of the invention include assigning a single permanent account to a consumer, and having the consumer use derived account identifiers associated with a particular payment mechanism that the consumer is using. If one payment mechanism is compromised, other payment mechanisms are not compromised.

One embodiment of the invention is directed to a method comprising creating a plurality of derived account identifiers, wherein each derived account identifier is derived from a single permanent account identifier associated with a consumer, and wherein each derived account identifier is associated with a different payment mechanism; and providing the plurality of derived account identifiers to the consumer.

Another embodiment of the invention is directed to a computer readable medium comprising code for creating a plurality of derived account identifiers, wherein each derived account identifier is derived from a single permanent account identifier associated with a consumer, and wherein each derived account identifier is associated with a different payment mechanism; and code for providing the plurality of derived account identifiers to the consumer.

Another embodiment of the invention is directed to a method comprising using a first derived account identifier in a first transaction; using a second derived account identifier in a second transaction; wherein each of the first and second derived account identifiers is associated with a different payment mechanism, and wherein each of the plurality of derived account identifiers is derived from a single permanent account identifier.

Another embodiment of the invention is directed to a plurality of portable consumer devices comprising a first portable consumer device comprising a first derived account identifier; and a second portable consumer device comprising a second derived account identifier, wherein the first and second derived account identifiers are derived from a single permanent account identifier.

Another embodiment of the invention is directed to a method comprising receiving an authorization request message comprising a derived account identifier, wherein the first derived account identifier is associated with a specific payment mechanism, and wherein the derived account identifier is associated with a single permanent account identifier; determining the single permanent account identifier associated with the derived account identifier; and forwarding the authorization request message to an issuer using the single permanent account identifier.

Another embodiment of the invention is directed to a computer readable medium comprising code for receiving an authorization request message comprising a derived account identifier, wherein the derived account identifier is associated with a specific payment mechanism, and wherein the derived account identifier is associated with a single permanent account identifier; code for determining the single permanent account identifier associated with the derived account identifier; and code for forwarding the authorization request message to an issuer using the single permanent account identifier.

These and other embodiments of the invention are described in further detail below with reference to the drawings and the Detailed Description.

DETAILED DESCRIPTION

Figure 1:
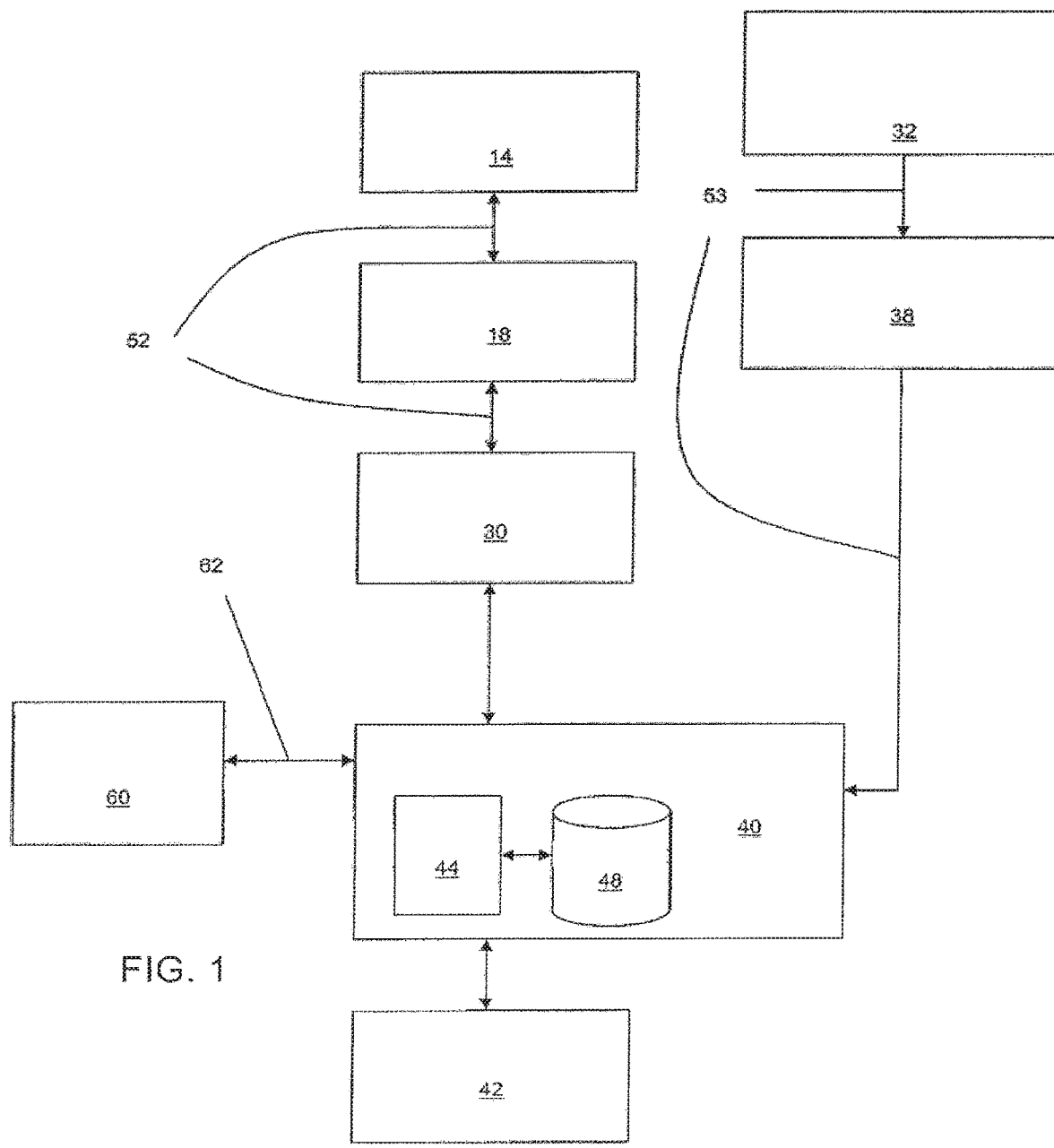
FIG. 1 is a block diagram of a system according to an embodiment of the invention.

Embodiments of the invention can be used in a transaction environment that contains multiple payment mechanisms. As used herein, a "payment mechanism" can mean the agency or means by which a transaction is produced or is accomplished. Payment mechanism may include all various communication channels and portable consumer devices. A transaction can occur over any payment mechanism, Examples of various payment mechanisms may include transactions over the Internet, transactions using a payment card such as a credit card, transactions conducted over a telephone, and the like.

A "communication channel" is a subcategory of payment mechanism, and may include various ways of conducting a transaction using different components and/or communication paths. Examples of various communication channels include a channel including an access device or point-of-sale (POS) terminal (such as with a credit card), a merchant, an acquirer associated with the merchant, a payment processing organization, and an issuer; a channel associated with payment over the Internet; a channel associated with cellular telephone network (e.g., where payment is made via a cellular phone), etc.

A "portable consumer device" is a subcategory of payment mechanism, and may include a specific device that is being used to conduct a payment transaction. "Portable consumer devices" may include key fobs, payment cards, wireless phones, etc. A more detailed description of portable consumer devices is provided below.

In a conventional process, an issuer would issue a consumer a payment card such as a credit card. It would have an account number, an expiration date and a CVV2 value associated with it. The account number, the expiration date, and the CVV2 value would be used for both card present and card not present transactions. It may also be used with the consumer's cellular phone if the consumer's cellular phone is used to conduct payment transactions.

In embodiments of the invention, a consumer is assigned a single permanent account identifier for an account. In certain embodiments, this identifier is not directly used to conduct transactions between the customer and merchants. It can be a permanent identifier the consumer can use to reference the consumer's account. When purchase transactions are conducted, the consumer can use derived account identifiers. Each payment mechanism that is used by the consumer can have its own, separate, derived account identifier. The derived account identifiers can be associated with the single permanent account identifier, but they may be different.

As used herein, a derived account identifier may be an account identifier that is associated with the single permanent account identifier. The derived account identifier may be associated to the single permanent account identifier through a look up table, by means of sharing certain characteristics, by means of manipulating the single permanent account identifier through mathematical or other formulas to create the derived account identifiers, or by other suitable means. In some embodiments, the permanent account identifier may include a permanent account number that does not change (e.g., 1234567812345678). Derived account identifiers may include one or more pieces of information associated with the permanent account identifier. For example, an exemplary first derived account identifier may include the permanent account number, a first expiration date, and a first verification value. An exemplary second derived account identifier may include the permanent account number, a second expiration date, and a second verification value.

In embodiments of the invention, consumers use each derived account identifier only in coordination with the associated payment mechanism. For example, a consumer may have a single permanent account identifier for a permanent account, and two derived account identifiers: a first one for use with a credit card (the credit card being an instance of a portable consumer device), and a second one for any "card not present" transactions, such as for making purchases over the Internet (the Internet being a communication channel). When the consumer uses the credit card for in-person purchases, such as at a POS terminal, the first derived account identifier on the card is used, and is linked to the permanent account so that any purchases made are debited from the permanent account. Likewise, when shopping over the Internet, the consumer can make purchases from Internet based stores by providing the second derived account identifier to the Internet based stores, Any purchases made in this fashion are debited from the permanent account.

In certain embodiments, each derived account identifier is intended to act much as typical card information currently does. As such, each derived account identifier can be used for multiple transactions or purchases, with different merchants. After each commerce transaction, the account associated with the single permanent account identifier can be adjusted to reflect the transactions. For example, purchases made using a first derived account identifier and a second account identifier can be added together so that a consumer sees only one monthly statement for purchases made using those account identifiers. In this fashion, the consumer may need to maintain only a single account that is linked to the single permanent account identifier, while having the security of using multiple derived account identifiers. Each derived account can expire at some pre-defined time and date, but typically that expiration date is at least several months from the issue date of the derived account identifier. The number of commerce transactions that each derived account is usable for is only limited by the expiration date, and the amount of money or credit limit in the consumer's account.

In embodiments of the invention, if a derived account identifier is intercepted during use and then used in a fraudulent manner, that derived account identifier can be cancelled and a replacement derived account identifier can be issued. The replacement derived account identifier can be associated with the same portable consumer device or communication channel as the cancelled identifier. In this way, the customer can continue making purchases using the channels that have not been compromised, even while waiting for the replacement derived account identifier.

Specific embodiments of the invention can be described with reference to FIGS. 1-7.

FIG. 1 shows a system according to an embodiment of the invention. Other systems according to embodiments of the invention may include fewer or more components than are specifically shown in FIG. 1.

FIG. 1 shows an access device 18, an acquirer 30, a payment processing network 40, and an issuer 42, in operative communication with each other. The acquirer 30 and issuer 42 can communicate through the payment processing network 40. A mobile gateway 38 may also be in communication with the issuer 42 via the payment processing network 40. A computer 60 (e.g., a personal computer) may also be in communication with the issuer 42 via the payment processing network 40.

The acquirer 30 may be a bank that is associated with the access device 18, and the issuer 42 may issue the first and second portable consumer devices 14, 32 to the consumer.

As used herein, an "acquirer" is typically a business entity, e.g., a commercial bank that has a business relationship with a particular merchant or other entity. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The payment processing network 40 may have a server computer 44, as well as a database 48, The server computer 44 is typically a powerful computer or cluster of computers. For example, the server computer can be a large mainframe, a minicomputer cluster, or a group of servers functioning as a unit. In one example, the server computer may be a database server coupled to a web server.

The payment processing network 40 may comprise or use a payment processing network such as VisaNet™. The payment processing network 40 and any communication network that communicates with the payment processing network 40 may use any other suitable wired or wireless network, including the Internet. The payment processing network 40 may be adapted to process ordinary debit or credit card transactions.

The server computer 44 may comprise or be associated with a computer readable medium comprising code for receiving a derived account identifier, and then determining the single permanent account identifier from the derived account identifier. The computer readable medium may also comprise code for using the single permanent account to route any authorization request message to the appropriate issuer 42.

For simplicity of illustration, one access device 18, one acquirer 30, and one issuer 42 are shown. However, it is understood that in embodiments of the invention, there can be multiple access devices, acquirers, issuers, as well as server computers, databases, accounts, etc.

Figure 2:
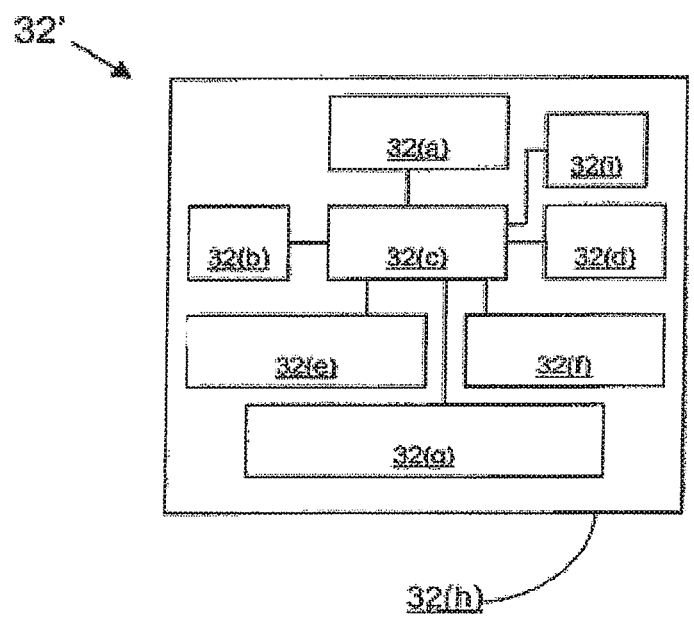
FIG. 2 is a block diagram of a portable consumer device that can be in the form of a phone.

An exemplary portable consumer device 32' in the form of a phone may comprise a computer readable medium and a body as shown in FIG. 2. (FIG. 2 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32'.

In some embodiments, and regardless of the type of portable consumer device that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a radio or cellular network may be applied to contactless element 32(g) by means of a contactless element interface (not shown). The contactless element interface functions to permit the exchange of data and/or control instructions between the mobile device circuitry (and hence the radio or cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

Figure 3:
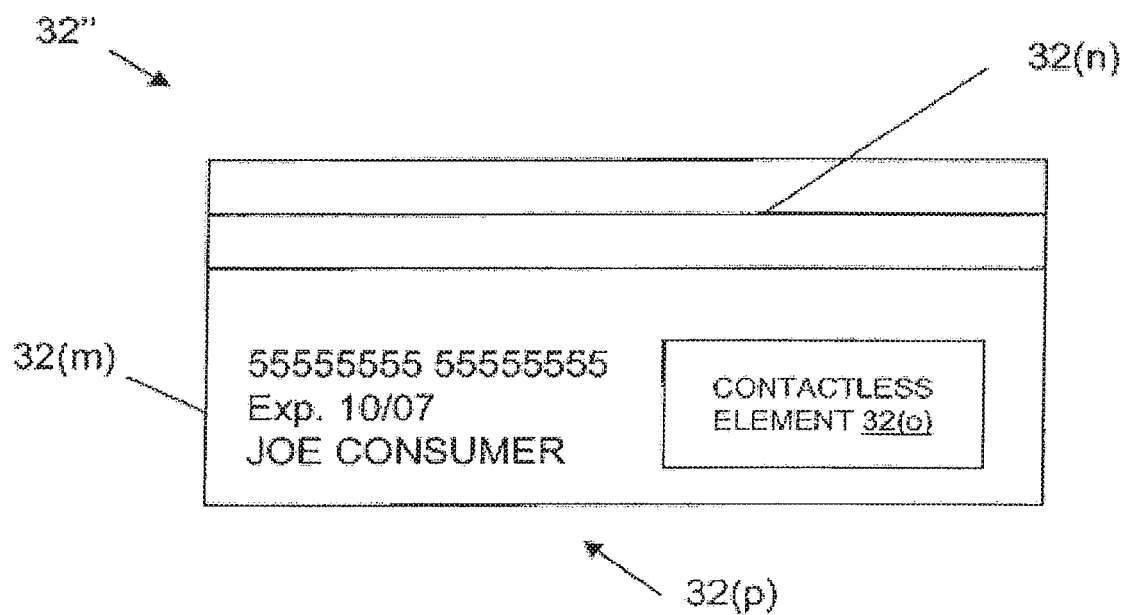
FIG. 3 is a block diagram of a portable consumer device in the form of a payment card.

An example of a portable consumer device 32" in the form of a card is shown in FIG. 3. FIG. 3 shows a plastic substrate 32(m). A contactless element 32(o) for interfacing with an access device 34 may be present on or embedded within the plastic substrate 32(m). Consumer information 32(p) such as an account number, expiration date, a verification value, and consumer name may be printed or embossed on the card. Also, a magnetic stripe 32(*n*) may also be on the plastic substrate 32(*m*).

As shown in FIG. 3, the portable consumer device 32" may include both a magnetic stripe 32(*n*) and a contactless element 32(*o*). In other embodiments, both the magnetic stripe 32(*n*) and the contactless element 32(*o*) may be in the portable consumer device 32". In other embodiments, either the magnetic stripe 32(*n*) or the contactless element 32(*o*) may be present in the portable consumer device 32".

Figure 4:
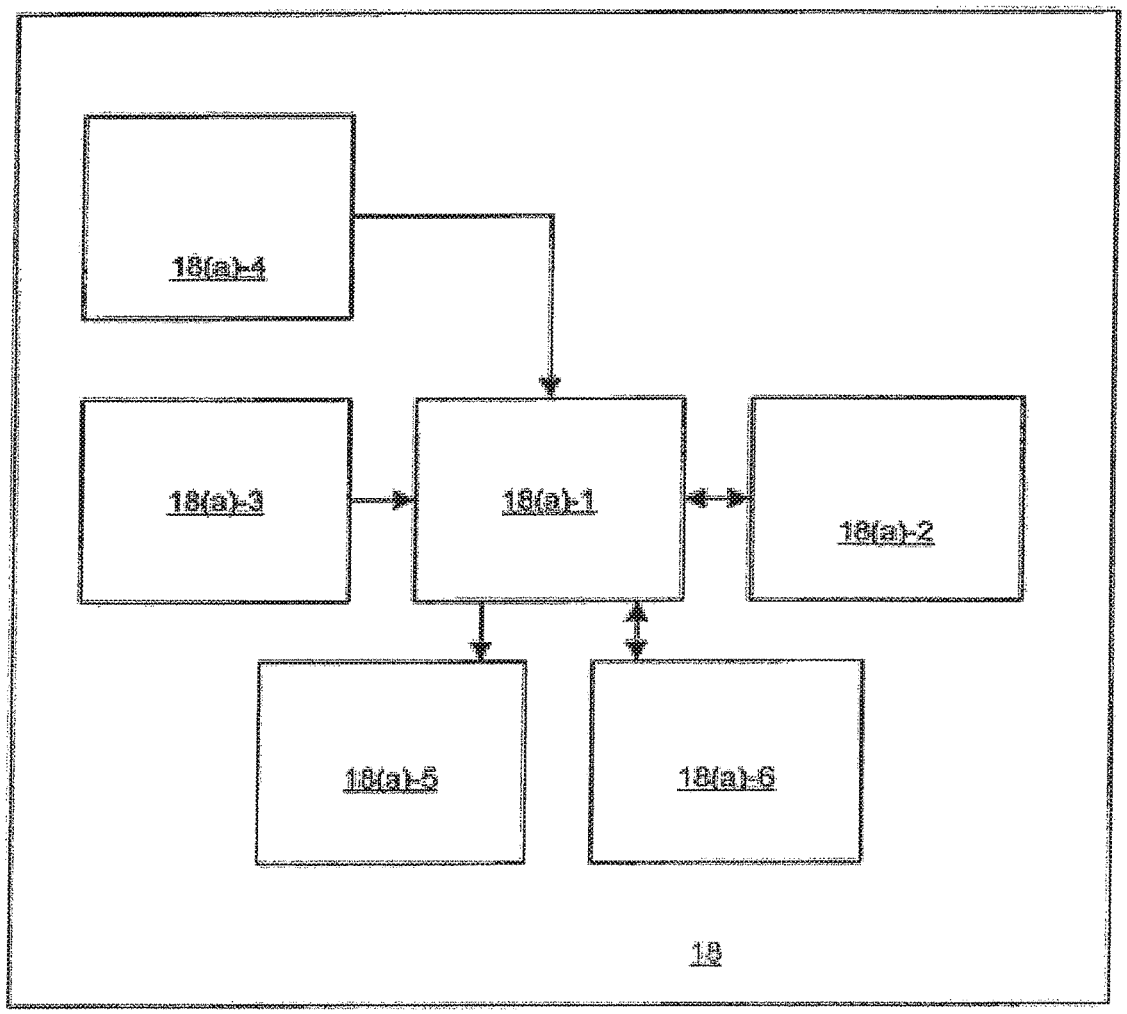
FIG. 4 is a block diagram of an access device according to an embodiment of the invention.

FIG. 4 shows a block diagram showing basic components that may reside in a POS terminal such as access device 18. An exemplary access device 18 may comprise a processor 18(*a*)-1, a computer readable medium 18(*a*)-2, a keypad 18(*a*)-3, a portable consumer device reader 18(*a*)-4, an output device 18(*a*)-5, and a network interface 18(*a*)-6, which can all be operatively coupled to the processor 18(*a*)-1. Exemplary portable consumer device readers can include RF (radio frequency) antennas, magnetic stripe readers, etc. that interact with the portable consumer device 32, Suitable output devices may include displays and audio output devices. Exemplary computer readable media may include one or more memory chips, disk drives, etc. The network interface 18(*a*)-6 may allow the access device 18 to send and receive messages from the acquirer 30, payment processing network 40, and/or the issuer 42.

Referring to FIG. 1, according to certain embodiments, each communications channel may be associated with a different derived account identifier. For example, a consumer may have three separate derived account identifiers, one each for a separate communications channel. The consumer may have a first derived account identifier for use with first communications channel 52. In this embodiment, the first communications channel 52 includes the path that is formed by access device 18, and acquirer 30. This communications channel is for purchases made in person. It comprises using a first portable consumer device 14, such as a credit card. First portable consumer device 14 will contain the first derived account identifier, and can be used for transactions in person, such as making purchases at a store.

The consumer may also have a second derived account identifier for use with second derived communications channel 53. In this embodiment, second communications channel 53 includes the path that is formed by mobile gateway 38. This communications channel is for purchases made with an electronic device such as second portable consumer device 32, which may be a cell phone. Second portable consumer device 32 can contain the second derived account identifier, and can be used for transactions.

The consumer may also have a third derived account identifier for use with third communications channel 62. In this embodiment, third communications channel comprises the Internet. This communications channel is for purchases made with devices (such as user computer 60) that are connected to the Internet. User computer 60 may contain the third derived account identifier in a memory storage, or the third derived account identifier may be input into user computer 60 separately for each transaction.

In the above embodiment, each derived account identifier can only be used with its associated channel (i.e., first derived account identifier can only be used with first communications channel 52, second derived account identifier can only be used with second communications channel 53, and third derived account identifier can only be used with third communications channel 62). As in the above example, if the consumer is at a store, this comprises first communications channel 52. As such, if she wishes to make a purchase, she would use first portable consumer device 14 (in this example, a credit card) containing the first derived account identifier, for that purchase. Likewise, if she wishes to make a purchase over the Internet (third communications channel 62), she would use the third derived account identifier.

In the above embodiment, if the first derived account identifier on the first portable consumer device 14 is used in an Internet transaction (i.e., over communication channel 62), that transaction can be rejected by the payment processing network 40 or the issuer 42. Likewise, even if the third derived account identifier is stolen by fraudulent actors while being used in an Internet transaction, it is unusable in any other channel, Commonly in fraud situations, the fraudulent actors will take stolen credit card information and create a physical card to use for in-person situations. In embodiments of the invention however, the third derived account identifier cannot be used in-person (i.e., it cannot be used with communication channel 52), and so any such transactions can be refused, preventing fraudulent purchases.

Referring to FIG. 1, according to other embodiments, each portable consumer device may be associated with a different derived account identifier derived from a single permanent account identifier associated with the consumer. For example, the first portable consumer device 14 may be a credit card and the second portable consumer device 32 may be a key-fob, and each may be associated with a separate derived account identifier.

In this example, the first portable consumer device 14 and the second portable consumer device 32 may be associated with first and second derived account identifiers. The first and second account identifiers may be derived from a single permanent account identifier associated with the consumer. Therefore in this example, the credit card 14 may contain or be associated with the first derived account identifier, and the key-fob 32 may contain or be associated with the second derived account identifier. In this embodiment, for the consumer to consummate a transaction, she must use a portable consumer device that contains the correct derived account identifier (i.e., the identifier that is associated with the portable device being used).

In alternative embodiments, several communication channels may share the same derived account identifiers and/or portable consumer devices. In one implementation, in FIG. 1, third communication channel 62 may be associated with a first derived account identifier, and the first and second communication channels 52 and 53 may be associated with a second derived account identifier. For example, third communication channel 62 may be for transactions that take place over the Internet. Using this third communication channel 62, the consumer inputs the first derived account identifier when making purchases. First and second communication channels 52 and 53 may be for transactions using a first portable consumer device 14 (such as a credit card) and a second portable consumer device 32 (such as a cellular telephone), respectively. Both the first portable consumer device 14 and the second portable consumer device 32 may contain the same second derived account identifier in this example.

Embodiments of the invention contemplate that different communication channels and portable consumer devices may contain various combinations of derived account identifiers as may be desirable. In other embodiments, a communication channel or portable consumer device may be associated with more than a single derived account identifier. For example, a consumer may be given several derived account identifiers, all for use in Internet transactions. Or the consumer may be provided with several credit cards, each containing a different derived account identifier. The amount of derived account identifiers provided to a consumer, and to which portable consumer devices and communication channels they are associated with, can vary depending on the needs of the issuer, the consumer, or the payment processing network.

Figure 5:
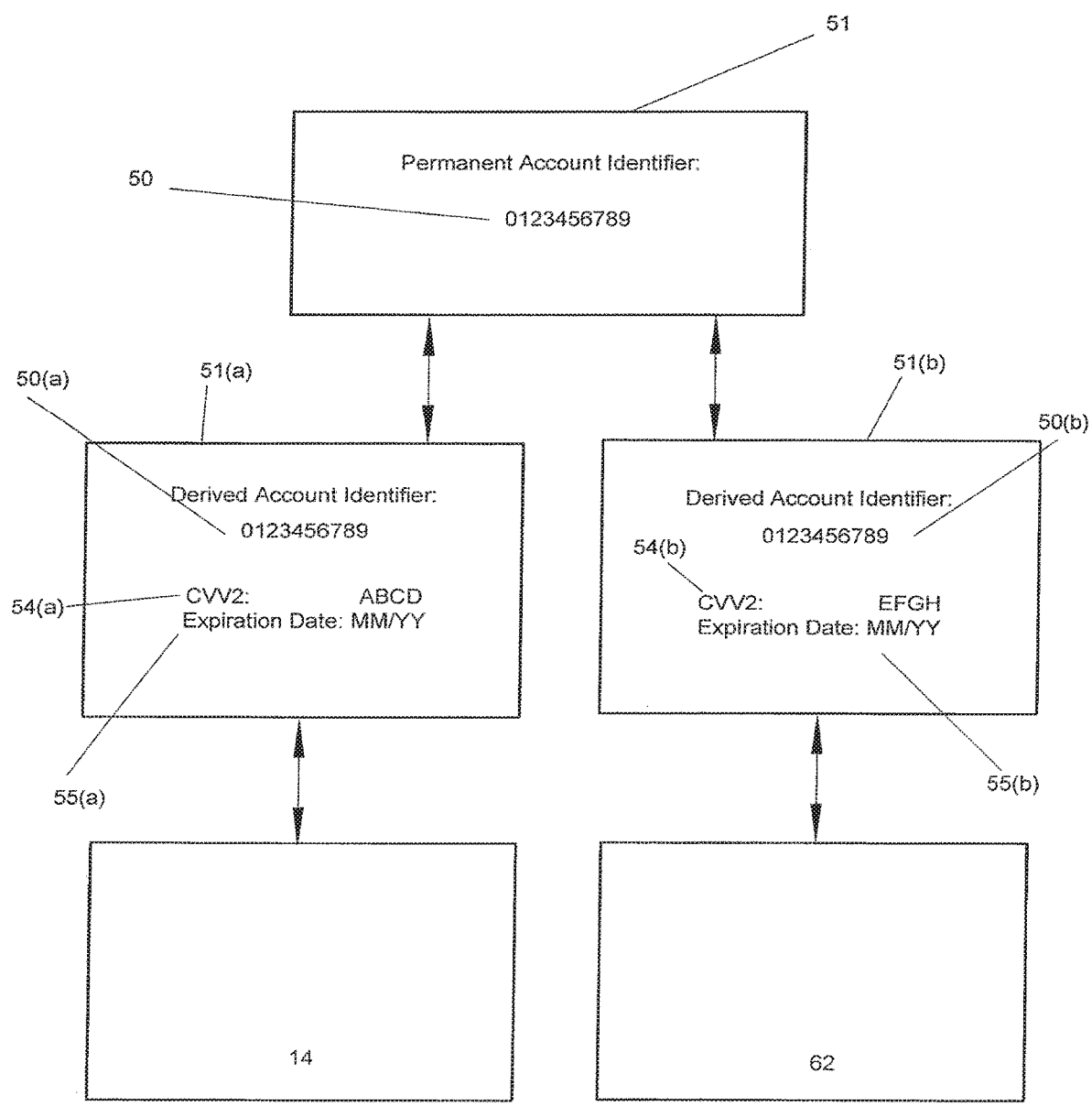
FIG. 5 is a diagram showing the relationship between a permanent account and derived accounts according to an embodiment of the invention.

FIG. 5 shows the relationship between derived account identifiers and a single permanent account identifier according to an embodiment of the invention, and how the derived account identifiers are created from the single permanent account identifier. This process of derivation is according to a preferred embodiment of the invention. Permanent account identifier 51 may include a base account number 50, which in this implementation is the numeral string 0123456789. The derived account identifiers in this example, each comprise three parts. First derived account identifier 51(a) comprises a first account number 50(a), which may be the same as the base account number 50, a first verification value 54(a), and a first expiration date 55(a). Second derived account identifier 51(b) comprises a second account number 50(b), which may be the same as the base account number 50, a second verification value 54(b), and a second expiration date 55(b). In this embodiment, the base account numbers 50(a) and 50(b) of the first and second derived account identifiers 51(a), 51(b) are identical to the base account number 50 of the permanent account identifier 51. What has been varied is the other parts of the derived account identifiers 51(a), 51(b), namely the verification values (54(a) and 54(b)) and the expiration dates (55(a) and 55(b)). The parts of the derived identifiers may be assigned by the issuer or an organization associated with the payment processing network, once the base number 50 of the permanent account identifier 51 has been assigned. By way of example, expiration date 55(a) may be October, 2009, and expiration date 55(b) may be February 2010. Verification value 54(a) may be the number 012, and verification value 54(b) may be the number 789.

Each of the derived account identifiers is associated with its own communication channel or portable consumer device. Derived account identifier 51(a) can be associated with first communication channel 52, and derived account identifier 51(b) can be associated with second communication channel 62. Both 52 and 62 may be any type of channel. For example, as with FIG. 1, first communication channel 52 may be a channel for in person transactions, and second communications channel 62 may be for transactions that take place over the Internet. Transactions over communication channel 52 may be performed using a portable consumer device 14, such as a credit card. For transactions over this first communication channel 52, first account number 50(a) can be the same as the base account number 50, and the first verification value 51(a) and first expiration date 54(a) are printed on the portable consumer device 14. When the consumer wishes to make a transaction over the second communications channel 62, she can use the second derived account identifier 51(b), In this case, she can use base account number 50(b) as the credit card number that is requested by an Internet store, and enter the second verification value 54(b) and the second expiration date 55(b) onto any website forms, to make a purchase over the Internet.

Assigning each derived account identifier with a unique expiration date and verification value, while keeping the same base number as the single permanent account identifier, is a simple yet novel way to create many unique derived account identifiers that can all be associated with the single permanent account identifier. A credit card number with a missing or incorrect expiration date may not be accepted for use in purchase transactions. As such, even if one derived account identifier is discovered and used in fraudulent transactions, any other related derived account identifiers are not compromised.

In the embodiments discussed above, the derived account numbers and the base account number are the same. In other embodiments, the derived account numbers may be different than the base account number. In such embodiments, the derivation of derived account numbers from the permanent account identifier may occur using any other suitable process. The process of derivation can include combining numbers and letters together without alteration, manipulating numbers using a mathematical formula, etc. For example, a permanent account identifier such as 1234567812345678 may be altered to three different derived account identifiers by multiplying the permanent identifier by 3, 6, and 9, respectively and taking the 16 rightmost digits. The three derived numbers could be used for three different payment mechanisms that the consumer might use (e.g., a first one including a POS terminal, a second one using a mobile gateway, and a third one using an Internet connection.

In one exemplary embodiment, the payment processing network 40 may generate the single permanent account identifier and corresponding derived account identifiers. In this case, the derived account identifiers would be provided to the issuer 42. In another embodiment, issuer 42 may generate the single permanent account identifier and the derived account identifiers. The derived account identifiers would then be communicated to the payment processing network 40. In a further embodiment, issuer 42 may generate the single permanent account identifier and provide it to payment processing network 40. Payment processing network 40 would then create the associated derived account identifiers from the provided single permanent account identifier.

Figure 6:
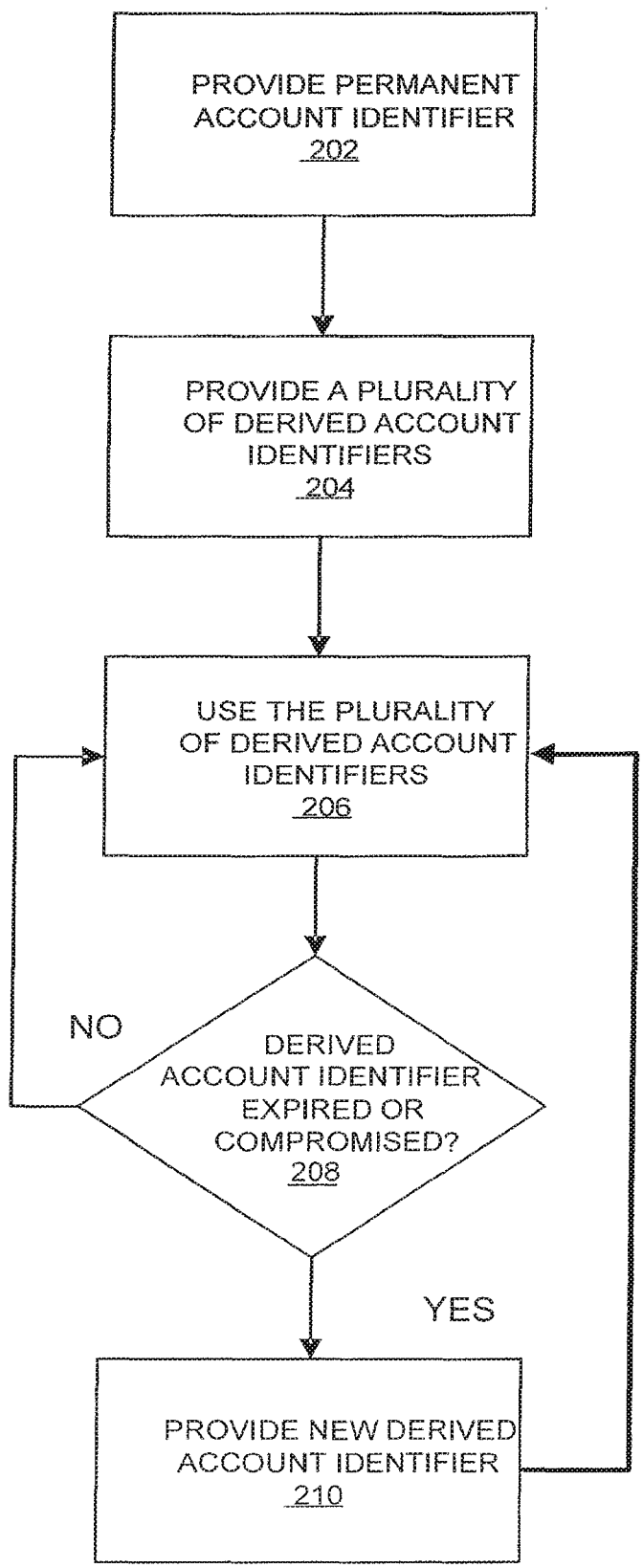
FIG. 6 is a flowchart illustrating a method according to an embodiment of the invention.

A method of performing an embodiment of the invention is detailed in FIG. 6. In step 202, an issuer or an organization associated with a payment processing network can generate a permanent account identifier, and assign the permanent account identifier to a consumer. This permanent account identifier may be used to reference the consumer's account with the issuer or organization. For example, the consumer may open up a credit card account with an issuer such as a bank. The bank will then generate a permanent account identifier and use that as the credit card account number. Then in step 204, the issuer or organization will generate, from the permanent account identifier, a plurality of different derived account identifiers for each of the communication channels and/or portable consumer devices that a consumer might use. These identifiers then will be provided to the consumer.

The derived account identifiers that have been generated are then associated with separate communication channels or portable consumer devices. For example, as explained above, a first derived account identifier can be assigned to a first portable consumer device, a second derived account identifier can be assigned to a second portable consumer device, and a third derived account identifier can be assigned for the consumer to use when the consumer uses a computer in a "card not present" type of transaction.

Each derived account identifier can then be used in conjunction with its associated communication channel or portable consumer device. The consumer can use any of the derived account identifiers that she was provided for commerce transactions, as seen in step 206 and as shown above.

The issuer or organization can monitor to see if any of the derived account identifiers have expired or been compromised. This is shown in step 208. If that answer is "No", i.e. none of the derived account identifiers have expired or been compromised, the consumer may keep using all of them as in step 206, If that answer is "Yes", i.e. a derived account identifier has expired or has been compromised, then the expired or compromised identifier may be cancelled and made unusable by the consumer. The issuer or organization can create a replacement derived account identifier to replace the cancelled ones in step 210, and associate them with the communication channels or portable consumer devices that had previously been associated with the cancelled derived account identifiers. Once this happens, the consumer may use the new derived account identifier in place of the cancelled one, as in step 206.

Figure 7:
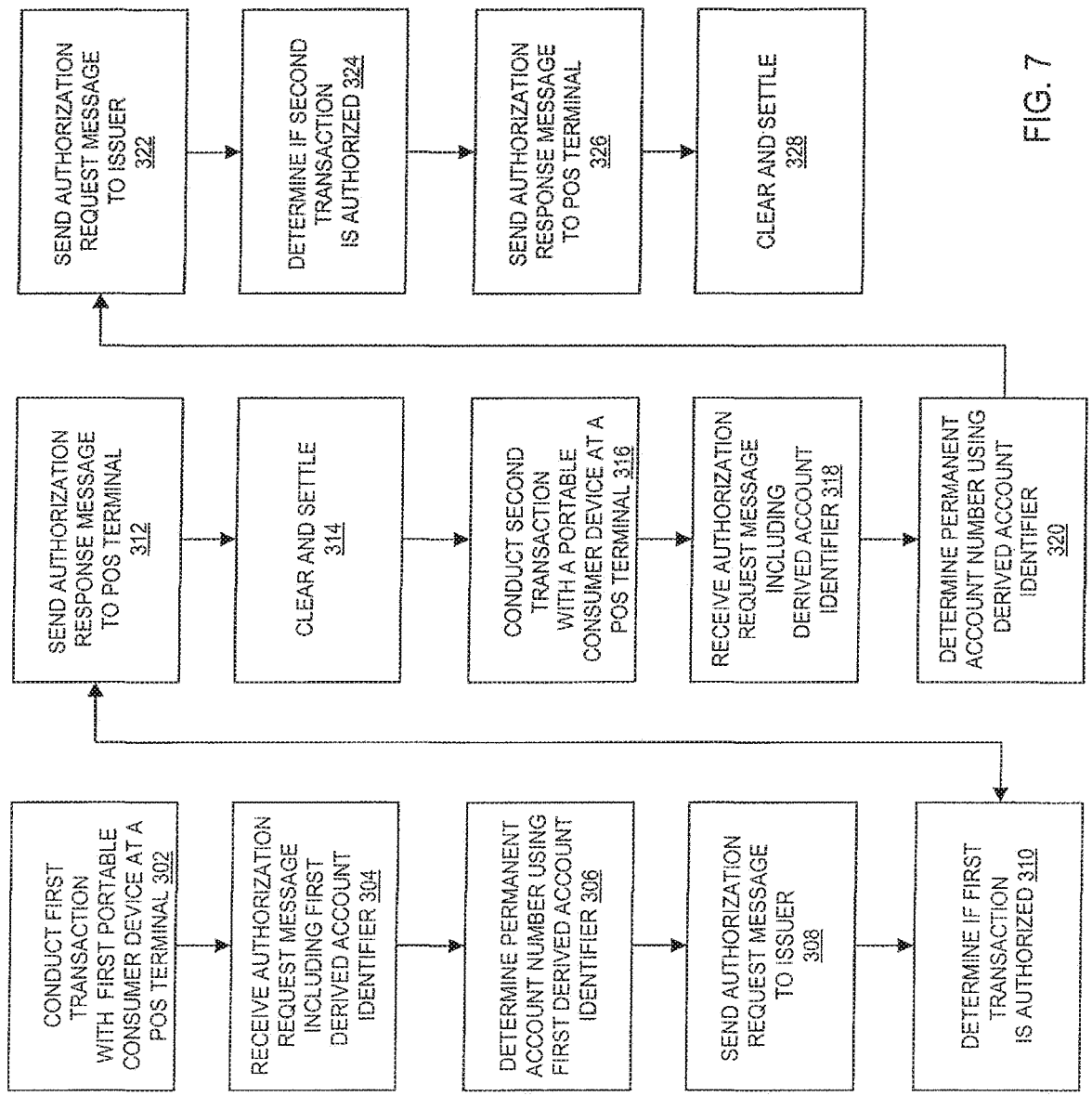
FIG. 7 is a flowchart illustrating a method according to an embodiment of the invention.

The method of using the invention according to one embodiment is shown in FIG. 7. The reference numbers used below refer to the steps in FIG. 7, and the components in FIG. 1. In this embodiment, a consumer has been assigned a single permanent account identifier, and has been provided with a plurality of derived account identifiers. Each derived account identifier is associated with a specific type or category of communication channel or portable consumer device. In step 302, the consumer can use a first portable consumer device 14 at a merchant that has a POS terminal (which is an example of access device 18), The first portable consumer device 14 may be in the form of a card. The first portable consumer device is associated with a first derived account identifier. The POS terminal can generate an authorization request message in step 304, which includes information in the first derived account identifier. It is then sent to the acquirer 30, and then to the payment processing network 40. A server computer 44 in the payment processing network 40 can then use a lookup table or the like in a database 48 to identify the single permanent account identifier associated with the first derived account identifier in Step 306. The single permanent account identifier may include the correct BIN or bank identification number for the issuer 42. In step 308, the payment processing network 40 then sends the authorization request message to the appropriate issuer 42.

Then, in step 310, the issuer 42 determines whether or not the transaction is authorized. The issuer 42 may authorize the transaction if there is sufficient credit and/or funds in the consumer's account. The issuer 42 may not authorize the transaction if there is insufficient credit or funds.

The issuer 42 then generates an authorization response message that is sent back to the POS terminal via the payment processing network 40, in step 312. During this step, the payment processing network 40 may convert the single permanent account identifier back to the first derived account identifier information. The authorization response message is received by the POS terminal, which can inform the consumer as to whether or not the transaction has been approved.

After the transaction is approved, a normal clearing and settlement process can take place, in step 314.

Then, the consumer may conduct a second transaction, at a POS terminal in step 316 using a second portable consumer device The second portable consumer device used in the second transaction can be associated with a second derived account identifier. For example, the second portable consumer device may be in the form of a wireless phone with a contactless communication element. The second transaction may be conducted with a second portable consumer device (and a second derived account identifier that is associated with the second portable consumer device). The POS terminal for the second transaction may be a different terminal from the one in the first transaction, or it may be the same terminal. The process for this second transaction is substantially similar to the process in the first transaction. In step 318, the POS terminal sends an authorization message that includes the derived account identifier used in the second transaction, to the payment processing network 40. The payment processing network determines the permanent account identifier in step 320, and forwards the authorization request message to the issuer 42 in step 322. The issuer 42 determines if the transaction is authorized in step 324, using the same criteria as in step 310.

The issuer 42 then generates an authorization response message that is sent back to the POS terminal via the payment processing network 40, in step 326. The authorization response message may include the derived account identifier used in the second transaction. It is then received by the POS terminal, which can inform the consumer as to whether or not the transaction has been approved. Clearing and settlement then takes place in step 328. Further transactions can subsequently be conducted using the same derived account identifier, or other derived account identifiers in the same manner (e.g., using an authorization request message) as described above in steps 302-328.

Embodiments of the invention have a number of advantages. For example, the permanent account number associated with the consumer is not exposed out in the open at any time in some embodiments. Further, even if one derived account identifier is compromised, the single permanent account identifier and the other derived account identifiers are not compromised. Also, this invention improves the ability of issuers to retain its holders (e.g., cardholders). In certain embodiments, the single permanent account identifier is not required to have an expiration date, and it is possible to keep the consumer associated with the account for life. Further, in embodiments of the invention, even if a derived account identifier associated with one channel or portable consumer device is cancelled, other account identifiers associated with other channels or devices may be used. Thus, the cancellation of one derived account identifier does not mean that all account identifiers become inactive.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary, A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a computer, a first authorization request message for a first transaction comprising a first derived account identifier from an access device, the first derived account identifier being one of a plurality of derived account identifiers associated with different payment mechanisms, wherein the first derived account identifier is associated with a permanent account identifier, wherein the first derived account identifier can only be used with a first payment mechanism;

determining, by the computer and during the first transaction, that the first derived account identifier is being used with the first payment mechanism and not with another type of payment mechanism;

in response to determining that the first derived account identifier is being used with the first payment mechanism, accessing, by the computer, a database of derived and permanent account identifiers to identify the permanent account identifier associated with the first derived account identifier;

exchanging, by the computer, the first derived account identifier in the first authorization request message with the permanent account identifier in the first authorization request message;

forwarding, by the computer and during the first transaction, the first authorization request message including the permanent account identifier to an issuer for approval;

receiving, by the computer, a second authorization request message for a second transaction comprising a second derived account identifier from a mobile phone, the second derived account identifier being one of a plurality of derived account identifiers associated with different payment mechanisms, wherein the second derived account identifier is associated with the permanent account identifier, wherein the second derived account identifier can only be used with a second payment mechanism;

determining, by the computer and during the second transaction, that the second derived account identifier is being used with the second payment mechanism and not with another type of payment mechanism;

in response to determining that the second derived account identifier is being used with the second payment mechanism, accessing, by the computer, the database of derived and permanent account identifiers to identify the permanent account identifier associated with the second derived account identifier;

exchanging, by the computer, the second derived account identifier in the second authorization request message with the permanent account identifier in the second authorization request message; and forwarding, by the computer and during the second transaction, the second authorization request message including the permanent account identifier to the issuer for approval.

2. The method of claim 1, wherein the computer is in a payment processing network located between a plurality of acquirers and issuers.

3. The method of claim 1, wherein the access device receives the first derived account identifier from a payment card which stores the first derived account identifier.

4. The method of claim 1, wherein the first and second derived account identifiers are formed by mathematically altering the permanent account identifier.

5. The method of claim 1, wherein the access device is a point of sale terminal.

6. The method of claim 1, the mobile phone is a cellular phone.

7. The method of claim 1, wherein the first authorization request message is received from the access device via an acquirer.

8. The method of claim 1, wherein the mobile phone comprises a contactless element.

9. The method of claim 1, further comprising:

receiving an authorization response message comprising the permanent account identifier from the issuer;

modifying the authorization response message to replace the permanent account identifier with the first derived account identifier; and transmitting the modified authorization response message to the access device.

10. The method of claim 9, wherein the authorization response message is a first authorization response message, and the modified authorization response message is a first modified authorization response message, and the method further comprises:

receiving a second authorization response message comprising the permanent account identifier from the issuer;

modifying the second authorization response message to replace the permanent account identifier with the second derived account identifier; and transmitting the modified second authorization response message to the mobile phone.

11. A computer comprising:

a processor; and a computer readable medium, the computer readable medium comprising code, executable by the processor, for implementing a method comprising:

receiving, by the computer, a first authorization request message for a first transaction comprising a first derived account identifier from an access device, the first derived account identifier being one of a plurality of derived account identifiers associated with different payment mechanisms, wherein the first derived account identifier is associated with a permanent account identifier, wherein the first derived account identifier can only be used with a first payment mechanism;

determining, by the computer and during the first transaction, that the first derived account identifier is being used with the first payment mechanism and not with another type of payment mechanism;

in response to determining that the first derived account identifier is being used with the first payment mechanism, accessing, by the computer, a database of derived and permanent account identifiers to identify the permanent account identifier associated with the first derived account identifier;

exchanging, by the computer, the first derived account identifier in the first authorization request message with the permanent account identifier in the first authorization request message;

forwarding, by the computer and during the first transaction, the first authorization request message including the permanent account identifier to an issuer for approval;

receiving, by the computer, a second authorization request message for a second transaction comprising a second derived account identifier from a mobile phone, the second derived account identifier being one of a plurality of derived account identifiers associated with different payment mechanisms, wherein the second derived account identifier is associated with the permanent account identifier, wherein the second derived account identifier can only be used with a second payment mechanism;

determining, by the computer and during the second transaction, that the second derived account identifier is being used with the second payment mechanism and not with another type of payment mechanism;

in response to determining that the second derived account identifier is being used with the second payment mechanism, accessing, by the computer, the database of derived and permanent account identifiers to identify the permanent account identifier associated with the second derived account identifier;

exchanging, by the computer, the second derived account identifier in the second authorization request message with the permanent account identifier in the second authorization request message; and forwarding, by the computer and during the second transaction, the second authorization request message including the permanent account identifier to the issuer for approval.

12. The computer of claim 11, wherein the computer is in a payment processing network located between a plurality of acquirers and issuers.

13. The computer of claim 11, wherein the access device receives the first derived account identifier from a payment card which stores the first derived account identifier.

14. The computer of claim 11, wherein the first and second derived account identifiers are formed by mathematically altering the permanent account identifier.

15. The computer of claim 11, wherein the access device is a point of sale terminal.

16. The computer of claim 11, the mobile phone is a cellular phone.

17. The computer of claim 11, wherein the first authorization request message is received from the access device via an acquirer.

18. The computer of claim 11, wherein the mobile phone comprises a contactless element.

19. The computer of claim 11, wherein the method further comprises:
receiving an authorization response message comprising the permanent account identifier from the issuer;
modifying the authorization response message to replace the permanent account identifier with the first derived account identifier; and
transmitting the modified authorization response message to the access device.

20. The computer of claim 19, wherein the authorization response message is a first authorization response message, and the modified authorization response message is a first modified authorization response message, and the method further comprises:
receiving a second authorization response message comprising the permanent account identifier from the issuer;
modifying the second authorization response message to replace the permanent account identifier with the second derived account identifier; and
transmitting the modified second authorization response message to the mobile phone.

* * * * *